(12) United States Patent
Zhu et al.

(10) Patent No.: US 10,606,189 B1
(45) Date of Patent: Mar. 31, 2020

(54) DEVELOPER STORAGE CONTAINER AND IMAGE FORMING DEVICE WITH THE DEVELOPER STORAGE CONTAINER

(71) Applicant: JIANGXI KILIDER TECHNOLOGY CO., LTD, Shangrao (CN)

(72) Inventors: Jinjun Zhu, Shangrao (CN); Zhongxi Li, Shangrao (CN); Jiabing He, Shangrao (CN)

(73) Assignee: JIANGXI KILIDER TECHNOLOGY CO., LTD., Shangrao (CN)

( * ) Notice: Subject to any disclaimer, the term of this patent is extended or adjusted under 35 U.S.C. 154(b) by 0 days.

(21) Appl. No.: 16/294,946

(22) Filed: Mar. 7, 2019

(30) Foreign Application Priority Data

Jan. 21, 2019 (CN) .......................... 2019 1 0050955

(51) Int. Cl.
*G03G 15/08* (2006.01)

(52) U.S. Cl.
CPC ................................ *G03G 15/0889* (2013.01)

(58) Field of Classification Search
CPC ........................... G03G 15/0889; G03G 15/08
See application file for complete search history.

(56) References Cited

U.S. PATENT DOCUMENTS

| | | | | |
|---|---|---|---|---|
| 8,311,447 B2* | 11/2012 | Mitsuishi | ........... | G03G 15/0872 399/106 |
| 8,532,542 B2* | 9/2013 | Mitsuishi | ........... | G03G 15/0872 399/262 |
| 9,134,651 B1* | 9/2015 | Eto | ..................... | G03G 15/0877 |
| 2004/0170448 A1* | 9/2004 | Tanaka | ............... | G03G 15/0856 399/262 |
| 2008/0025764 A1* | 1/2008 | Kimura | .............. | G03G 15/0867 399/263 |
| 2011/0020039 A1* | 1/2011 | Mitsuishi | ........... | G03G 15/0872 399/262 |
| 2011/0085825 A1* | 4/2011 | Murase | .............. | G03G 15/0872 399/260 |
| 2013/0170873 A1* | 7/2013 | Carter, II | ........... | G03G 15/0865 399/263 |
| 2013/0322927 A1* | 12/2013 | Matsumoto | ........ | G03G 15/0879 399/258 |
| 2015/0338825 A1* | 11/2015 | Leemhuis | ................. | F16D 1/06 403/348 |
| 2017/0351197 A1* | 12/2017 | Geng | .................... | F16D 63/006 |

* cited by examiner

*Primary Examiner* — Francis C Gray
(74) *Attorney, Agent, or Firm* — Bayramoglu Law Offices LLC (57) ABSTRACT

A developer storage container and an image forming device with the developer storage container are provided, the developer storage container includes: a cylinder, the inner space of the cylinder can accommodate the developer, and the developer supply port that is connected with the inner space is disposed on the side of the cylinder; a driven shaft is arranged in the inner space of the cylinder and extends along the length direction of the cylinder; a driving gear is located on the side cover of the cylinder and connected with the first end of the driven shaft; a agitating screw, the rotation of the agitating screw can generate thrust, which enables the developer to be transported along the axis; a driving gear drives the driven shaft to rotate, and then drives the agitating screw to rotate.

19 Claims, 7 Drawing Sheets

DEVELOPER STORAGE CONTAINER AND IMAGE FORMING DEVICE WITH THE DEVELOPER STORAGE CONTAINER

CROSS REFERENCE TO RELATED APPLICATIONS

This application is based upon and claims priority to Chinese Patent Application No. 201910050955.0, filed on Jan. 21, 2019, the entire contents of which are incorporated herein by reference.

TECHNICAL FIELD

The present invention relates to the field of the developer storage container and image forming device, in particular to a developer storage container and an image forming device with the developer storage container.

BACKGROUND

In the prior art, the image forming device has an image carrier, a development unit and a developer storage container for receiving a developer; if the developer is supplied to the image carrier from the development unit, the electrostatic latent image formed on the image carrier is displayed as the developer image; the developer storage container has a developer discharge port that supplies a replenishing developer to a supply port provided in the development unit.

A developer storage container with a stirring shaft is provided in the prior art. A developer conveying element is required to be mounted on the stirring shaft, and the developer conveying element is configured as a PET film, which is adhered to the stirring shaft by double-sided tape; over time, the glue will age; in the printing process, the stirring shaft rotates the developer, the conveying element will be subjected to force; moreover, the developer may also infiltrate between the conveying element and the stirring shaft, resulting in insufficient adhesive force and the drop of the conveying element; when the conveying element falls off, the scraping force and the scope within the storage container will be reduced, which will lead to insufficient conveying developer, that is, insufficient powder quantity.

In summary, the existing developer storage container has at least the following problems under the above-mentioned structure: first, the stability of the supply regulator is insufficient; second, there is a certain probability of falling off for the developer conveying element on the stirring shaft, which lead to inadequate scraping power, the insufficient developer conveyed and so on.

SUMMARY

In order to overcome the defects of the prior art, the present invention provides a developer storage container and an image forming device with the developer storage container, which solves the problems of the prior art, and no additional developer conveying element is required, an agitating screw can not only stir the developer but also convey the developer, which can stably and uniformly convey developer; it also simplifies the production and processing procedures.

To achieve this goal, the present invention adopts the following technical scheme:

The present invention provides a developer storage container, and it includes: a cylinder, the cylinder extends along the length direction of the cylinder; the inner space of the cylinder can accommodate the developer, and the developer supply port that communicates with the inner space is disposed on the side of the cylinder; a driven shaft is arranged in the inner space of the cylinder and extends along the length direction of the cylinder; a driving gear is located on the side cover of the cylinder and connected with the first end of the driven shaft; a agitating screw, the rotation of the agitating screw can generate thrust, which enables the developer to be transported along the axis; a driving gear drives the driven shaft to rotate, and then drives the agitating screw to rotate. For the developer storage container provided by the invention, because the agitating screw is set as a spiral, the rotation of the agitating screw makes it possible to smoothly transport the developer when agitating the developer; in addition, because of the spiral, the rotating torque of the rotating screw is smaller, the rotation of the driven shaft is smoother, and the running efficiency of the agitating screw is improved; the driving gear drives the driven shaft to rotate; while the driven shaft rotates, the agitating screw rotates; the transmission hierarchy is simple, the agitating is more sufficient, and the agitating has the function of transporting developer at the same time, which improves the working efficiency and reduces the cost.

As a further improvement of the present scheme, the agitating screw comprises a spiral base plate capable of rotating with the driven shaft and a plurality of blades, one end of which is fixed on the spiral base plate. The spiral base plate is spirally shaped to facilitate the stirring of the agitating screw, the agitating resistance is small, and it also facilitates the delivery of developer; the fixed blades on the spiral base plate can further improve the agitating ability of the agitating screw.

As a further improvement of the present scheme, the spiral base plate is arranged on the outer side of the driven shaft; the first end of the spiral base plate is close to the driven shaft; from the first end to the second end of the spiral base plate, the spiral base plate extends around the driven shaft in a spiral shape and gradually moves away from the driven shaft; the first end and the second end of the spiral base plate are fixedly connected with the driven shaft. Such a fixed connection manner can facilitate the mounting of the spiral base plate, and at the same time, the difference in height from the first end to the second end of the spiral base plate is more favorable for the developer to be transported in a certain direction. In addition, the spiral shape of the spiral base plate also makes the rotating torsion of the rotating screw smaller; it is easy to operate, improves the efficiency, and further enhances the agitation function of the agitating screw.

As a further improvement of the present scheme, the number of agitating screw configured is two or more; the agitating screw is fixed and distributed on the driven shaft in turn, and the direction is consistent. By the combination of two or more spiral base plate, the developer is transported to the powder discharge port, thus the function of storing developer and transporting developer for the storage container is achieved; the uniform orientation is more conducive to the delivery of developer.

As a further improvement of the present scheme, a clearance is arranged between the adjacent blades; in this way, the developer can be further fully stirred and the resistance is reduced in the stirring process; the side of the blade and the outer surface of the spiral base plate present a first preset angle, and the blades are spirally arranged with the spiral extension of the spiral base plate. This will help to mix evenly, but also more conducive to the delivery of developer.

As a further improvement of the present scheme, the agitating screw also comprises one or more connecting pillars; one end of the connecting pillar is connected with the driven shaft, and the other end is connected with the spiral base plate. The connecting pillar can ensure the stability of the spiral base plate and further enhance the stirring function of the agitating screw.

As a further improvement of the present scheme, a second preset angle is deflected between the two adjacent connecting pillars, so that the spiral base plate spirally extends along the driven shaft. In this way, the spiral base plate can be well supported by multiple connecting pillars, and the overall force of the spiral base plate can be more balanced. At the same time, the multiple connecting pillars themselves can stir the developer.

As a further improvement of the present scheme, the driving gear is located on the first side cover of the first side of the cylinder; the driving gear is clamply connected with the first end of the driven shaft. The clamping connection makes the fixed connection of the driving gear and the driven shaft simple and convenient, so that a simple assembly can drive the driven shaft to rotate.

As a further improvement of the present scheme, the first end of the driven shaft is provided with a sleeve; the inner side wall of the driving gear is provided with a chuck matched with the sleeve and the sleeve socket. Insert the chuck into the sleeve such that the driving gear is clamply connected with the first end of the driven shaft. The sleeve matches with the chuck, which makes the positioning is simpler. The assembly can be directly completed by inserting the sleeve into the chuck.

As a further improvement of the present scheme, a plurality of elastic clamps are arranged on the chuck; the sleeve is provided with a plurality of clamp holes corresponding to the elastic clamps; the ends of multiple elastic clamps are provided with a clamp stand; when the chuck is inserted into the sleeve, each elastic clamp is inserted into the corresponding clamp hole until each clamp stand is clamped into the clamp hole and clamping connection is formed. This clamping connection method ensures that the connection is firm and the force is balanced, and the chuck and the sleeve are tightly connected.

As a further improvement of the present scheme, a bearing box is arranged on the second side cover of the second side of the cylinder; the second end of the driven shaft is provided with a rotary needle; the middle part of the bearing box is provided with a bearing hole matched with the rotary needle; the rotary needle can be inserted into the bearing box; the rotary needle is rotatably connected with the bearing box. The connection structure between the rotary needle and the bearing box is simple, and it is easy to realize the rotary connection between the rotary needle and the bearing box, thus achieve the mutual rotation of the driven shaft and the bearing box.

As a further improvement of the present scheme, a positioning hole with tapered cross section is arranged in the middle of the bearing box in the inner space of the cylinder, and the bearing hole is located in the middle of the positioning hole; the positioning hole is surrounded by a plurality of ribs. The tapered positioning hole can play a good guiding and positioning role, and it is convenient for the needle to be inserted into the bearing box, thus making the installation of the driven shaft and the bearing box more simple and convenient.

As a further improvement of the present scheme, the second side cover on the second side of the cylinder is welded with the cylinder by ultrasonic wave; the second side cover is fixed with a stiffener; the side cover is ultrasonically welded to the cylinder, and the removal of the side cover is simple, and the side cover is not damaged, in addition, the side cover can be reused, thereby saving cost. The length of the stiffener does not exceed the width of the second side cover, which has the advantage such as saving materials, convenient processing and saving space.

As a further improvement of the present scheme, the configuration of the driven shaft is composed of a plurality of rectangular plates. It is more convenient for the rectangular plate to fix the connection ring frame and other structures, and it is flexible and practical, and increases the strength of the driven shaft, thus making the driven shaft have a certain ability to agitating developer.

As a further improvement of the present scheme, a plurality of connection ring frames are fixed on the connecting pillar; the connecting ring frame is connected with one end of the connecting pillar. It is easy for the connection ring frame to combine with other components conveniently and flexibly. The connecting ring frame and the connecting pillar are integrally formed or detachably connected. When forming integrally, it can be directly processed by die, which is convenient for mass production; when connecting detachably, it can be easily disassembled and assembled.

As a further improvement of the present scheme, the side wall of the cylinder is provided with a rectangular wavy bulge for placing the cylinder. The bulge is used for placing the cylinder body, so that the cylinder body can be placed stably on the plane, while the rectangular wavy bulge is more stable, beautiful and practical.

As a further improvement of the present scheme, a flat handle is arranged outside the side of the cylinder; the handle and the cylinder can be detachably connected or fixedly connected. The flat handle makes it convenient to take and place the developer container, and it is convenient for the removable connecting handle to transport and dismantle.

As a further improvement of the present scheme, the connecting pillar, the spiral base plate or/and the driven shaft are integrally formed, or one or more connecting pillars, the spiral base plate or/and the driven shaft are detachably connected. When forming integrally, it is convenient for mass production, and processing and installation is easy; the structure is stable and firm. The one or more connecting pillars, the spiral base plate and the driven shaft can be detachably connected, which increases flexibility, and the number of connecting pillars is arranged according to the actual application, and the product maintenance is convenient.

The present invention provides an image forming device, including a developer storage container and the development unit stated above, and the developer storage container provides a developer for the development unit. The developer storage container is easy to use and does not need to install additional developer conveying elements. Therefore, the problems are to prevent from the root causes such as the dropping of developer conveying elements, inadequate scraping power and inadequate delivery of developer and so on.

In summary, the developer storage container provided by the present invention has a developer supply port, and the developer storage container can convey the developer to the supply port, and provide a supplementary developer for printers, photocopiers, etc. It is not necessary to install additional developer conveying elements. Therefore, the problems are to prevent from the root causes such as the dropping of developer conveying elements, inadequate scraping power and inadequate delivery of developer and so on.

Where:

1. Driving gear 2. Driven shaft 21. Rotary needle 22. Rectangular plate 3. Agitating screw 31. Spiral base plate 32. Connection pillar 321. Connection ring frame 33. Blade 4. Developer supply port 5. Cylinder 6. Wavy bulge 71. First side cover 72. Second side cover 8. Handle 9. Sleeve 91. Clamp hole 92. Chuck 921, Elastic champ 922. Champ stand 10. Stiffener 12. Bearing box 121. Bearing hole 1211. Positioning hole

DETAILED DESCRIPTION OF THE EMBODIMENTS

The technical scheme of the present invention will be further described below with reference to the attached drawings and the specific implementation modes.

As shown in FIGS. 1, 2, 3, 7, 8, 9, 10, 11, 12, 13, a developer storage container provided in this embodiment includes cylinder 5, driven shaft 2, driving gear 1 and agitation screw 3; the cylinder 5 extends along the length direction of the cylinder 5. The inner space of the cylinder 5 can accommodate the developer; on the side of the cylinder 5, a developer supply port 4 connected with the inner space is arranged. The driven shaft 2 is arranged in the inner space of the cylinder 5 and extends along the length direction of the cylinder 5; the driving gear 1 is located on the side cover of the cylinder 5 and is connected with the first end of the driven shaft 2; the driving gear 1 can match the transmitting gear on the printer or copier; the driving gear 1 is connected with driven shaft 2; the rotation of the agitating screw 3 can generate thrust, which enables the developer to be transported along the axis; the driving gear 1 drives the driven shaft 2 to rotate, and then drives the agitating screw 3 to rotate. For the developer storage container provided in the present invention, because the agitating screw 3 is set to a spiral shape, the rotation of the agitating screw 3 allows the developer to be smoothly conveyed while stirring the developer. In addition, the spiral shape also makes the rotating torsion of the rotating screw smaller, and the rotation of the driven shaft is smoother, thus, the operating efficiency of the agitating screw is improved. The driving gear 1 drives the driven shaft 2 to rotate, and the driven shaft 2 rotates while the agitating screw 3 rotates. The transmission hierarchy is simple, the stirring is more sufficient, meanwhile, the stirring has the function of transporting developer, which improves the working efficiency and reduces the cost.

As a further improvement for the above embodiment, As shown in FIGS. 7, 8, 9, 10, 11, 12, 13, the agitating screw 3 includes a spiral base plate 31 capable of rotating with the driven shaft 2 and a plurality of blades 33; one end of the plurality of blades 33 is fixed on the spiral base plate 31. The spiral shape of the spiral base plate 31 is beneficial to the full mixing of the agitating screw 3, with less stirring resistance and it is also convenient to transport the developer. Fixing the blade 33 on the spiral base plate 31 can further improve the agitating ability of the agitating screw and make the agitation sufficient.

As a further improvement for the above embodiment, As shown in FIGS. 7, 8, 9, 10, 11, 12, 13, the spiral base plate 31 is arranged on the outer side of the driven shaft 2. The first end of the spiral base plate 31 is close to the driven shaft 2; from the first end to the second end of the spiral base plate 31, the spiral base plate 31 extends spirally around the driven shaft 2 and gradually moves away from the driven shaft 2; the first end and the second end of the spiral base plate 31 are both fixed with the driven shaft 2. The driving gear 1 drives the driven shaft 2 to rotate; while the driven shaft 2 rotates, the agitating screw 3 is driven to rotate. Such fixed connection mode can facilitate the installation of the spiral base plate, and the inconsistency of the height between the first end and the second end of the spiral base plate is more conducive to convey the developer in a certain direction. In addition, the spiral shape of the spiral base plate also makes the rotating torsion of the rotating screw smaller, which is convenient to operate, improve efficiency, and further enhances the function of the agitating spiral 3. The number of the agitating screw 3 can be configured to be two or more; the agitating screw 3 is fixed and distributed on the driven shaft 2 in turn, and the orientations are identical. By the combination of two or more spiral base plate 31, the developer can be transported to the outlet of the powder, the function of storage and transporting developer for the container can be achieved. The identical orientation is more conducive to transport the developer. The identical orientation means that the spiral extension direction of the spiral base plate 31 is identical, and the variation rule of the distance between the spiral base plate 31 and the driven shaft 2 is identical. The clearance is arranged between the adjacent blades 33, so that the developer can be further fully stirred and the resistance in the stirring process can be reduced, the developer can be prevented from remaining on the blade 33 or being stuck in piles. The side of the blade 33 and the outer surface of the spiral base plate 31 present the first preset angle, and the plurality of blades 33 are spirally arranged with the spiral extension of the spiral base plate 31. This will help to mix evenly, reduce the torsion, and is also more conducive to conveying the developer.

As a further improvement for the above embodiment, As shown in FIGS. 7, 8, 9, 10, 11, 12, 13, the agitating screw 3 further includes one or more connecting pillars 32; one end of the connecting pillar 32 is connected to the driven shaft 2, and the other end thereof is connected to the spiral base plate 31. The connecting pillar 32 can ensure the stability of the spiral base plate 31 and further enhance the stirring function of the agitating screw 3; the connecting pillar 32 may be weldedly connected to the driven shaft 2, or may be integrally or detachably provided with a connecting ring frame 321 at the connection end of the connecting pillar 32 and the driven shaft 2; the connecting ring frame 321 surrounds the driven shaft 2 and is connected to the driven shaft 2. This makes the connection between the connecting pillar 32 and the driven shaft 2 more stable, and more effectively resist the damage of the connection stability by the centrifugal force generated by the rotation of the driven shaft 2. Because the spiral base plate 31 is spiral shape, there will be a certain angle between the connecting pillar 32, and the direction of each blade 33 varies with the spiral deformation of the spiral base plate 31, so that the stirring can be carried out in many directions, and the stirring is more evenly; the resistance can be reduced more easily, and it is more conducive to conveying the developer. As a further improvement of the present scheme, there is deflection of the second preset angle between two adjacent connecting pillars 32, which makes the spiral base plate 31 spirally extend along the driven shaft 2. This makes the spiral base plate to be well supported by multiple connecting pillars, meanwhile ensuring that the overall force of the base plate is more balanced; in addition, the multiple connecting pillars themselves can stir the developer to make the stirring more sufficient.

The driving gear 1 will rotate clockwise by matching with the position; the driving gear 1 will drive the driven shaft 2 to rotate clockwise in the process of rotation. When the driven shaft 2 rotates, the spiral base plate 31 on the driven shaft 2 drives the developer to stir. Further, since the driven shaft 2 is rotated clockwise, the structure of the spiral base plate 31 causes the developer to move toward the developer supply port 4 while being stirred. In the past, the developer storage container was a linear base plate; in the process of rotation, the torsion of different parts was different, which was not conducive to the stability of the printer, and there is no stable uniformity of the spiral base plate 31 when the developer is transported because of the linear base plate. In the present invention, the developer can be transported to the position of developer supply port 4 by combination of two spiral base plate 31, the function of storage and conveying the developer for the container is achieved.

As a further improvement for the above embodiment, As shown in FIGS. 4, 5, 9, 10, 11, 12, 13, the driving gear 1 is located on the first side cover 71 of the first side of the cylinder 5; the driving gear 1 is clamped to the first end of the driven shaft 2. The clamping makes the fixed connection between the driving gear and the driven shaft simple and convenient, so that the simple assembly can drive the driven shaft 2 to rotate. The first end of the driven shaft 2 is provided with a sleeve 95; the inner wall of the driving gear 1 is provided with a chuck 92 matched with the sleeve 95, and socketed with the sleeve 95; the chuck 92 is inserted into the sleeve 95 so that the driving gear 1 is clamped to the first end of the driven shaft 2. By combining the sleeve with the chuck, the positioning is simpler, and the assembly can be completed by inserting the sleeve directly into the chuck. A plurality of elastic clamps 921 are arranged on the chuck 92; the sleeve 95 is provided with a plurality of champ hole 91 corresponding to the elastic champs 921; the ends of multiple elastic clamps 921 are provided with a clamp stand 922; when the chuck 92 is inserted into the sleeve 95, each elastic champ 921 is inserted into the corresponding champ hole 91 until each clamp stand 922 is inserted into the champ hole 91 to form champing connection. The clamping method can ensure that the clamping is firm and the force is balanced, and the chuck and sleeve can be tightly connected. A bearing box 12 is arranged on the second side cover 72 on the second side of the cylinder 5; the second end of the driven shaft 2 is provided with a rotary needle 21; the middle part of the bearing box 12 is provided with a bearing hole 121 matching the rotary needle 21; the rotary needle 21 can be inserted into the bearing box 12; the rotary needle 21 and the bearing box 12 can be rotatably connected. The connection structure between the rotary needle 21 and the bearing box 12 is simple, and it is easy to realize the rotatable connection between the rotary needle 21 and the bearing box 12, thus achieving the mutual rotation of the driven shaft 2 and the bearing box 12. The middle part of the bearing box 12 in the inner space of the cylinder 5 is provided with a positioning hole 1211 with a tapered cross section, and the bearing hole 121 is located in the middle part of the positioning hole 1211; the positioning hole 1211 is enclosed by a plurality of ribs. The tapered positioning hole 1211 can play a good guiding and positioning role, and it is convenient for the rotary needle to be inserted into the bearing box, thus making the installation of the driven shaft 2 and the bearing box 12 more simple and convenient. When assembling, one end of the driven shaft 2 is inserted into the bearing box 12; an agitating screw 3 is fixed on the driven shaft 2; the rotary needle 21 of the driven shaft 2 is inserted into the bearing box 12; the other end of the driven shaft 2 is inserted into the sleeve 95; the connecting ring frame 321 near the connecting pillar 32 at one end of the driving gear 1 is clamped on the driven shaft 2; the chuck 92 on the second side cover 72 is inserted into the sleeve 95. After insertion, the elastic clamp 921 of the chuck 92 is stuck in the clamp hole 91 of the sleeve 95, thus the sleeve 95 and chuck 92 are locked, and driven shaft 2 and driving gear 1 are fixedly connected; the driving gear 1 can drive the driven shaft 2 to rotate by a fixed connection of the sleeve 95 and the driven shaft 2. The chuck 92 is inserted into the sleeve 95, so that the removal and assembly of the driven shaft 2 and the end wall is more convenient and quick, and the connection of the sleeve 95 chuck 92 can be realized by one insertion; the driven shaft 2, the agitating screw 3, etc. can be effectively fixed, meanwhile, the closure of the developer storage container can be completed. The radial dimension for the driven shaft 2 is smaller and smaller toward the end, which is convenient for insertion. Similarly, the radial dimension of the bearing hole 121 corresponding to the driven shaft 2, in particular the positioning hole 1211, is also initially large, and the radial dimension in the direction toward the end becomes smaller; the two correspond to each other, and the insertion is firm and convenient.

As a further improvement for the above embodiment, As shown in FIGS. 3, 4, 5, 6, the second side cover 72 on the second side of the cylinder 5 is welded with the cylinder 5 by ultrasonic wave; the stiffener 10 is fixed on the second side cover 72; the stiffener 10 is welded with the cylinder 5 by ultrasonic wave; the removal of the side cover is simple, and the side cover will not be damaged; the side cover can be reused and save the cost. Ultrasonic fusion is also called ultrasonic welding, usually used for plastic welding, and it is a high-tech technology for welding thermoplastic products, which can completely replace glue bonding. The various thermoplastic parts can be processed using ultrasonic welding techniques without addition of solvents, adhesives or other ancillary materials. The principle is that the ultrasonic energy is transmitted to the weld zone by the upper weldment, and the sound resistance is large at the interface of the two welds, thus the local high temperature is generated to fuse the weldments together. The length of the stiffener 10 does not exceed the width of the second side cover 72, which saves materials and space, and is convenient to process space. The range of stiffener 10 of the side cover in the prior art is large; the stiffener 10 often extends beyond the width of the side cover, and this is inconvenient for production and installation, and wastes material; by contrast, the side cover of the present invention reduces the stiffener 10, and makes the range of the stiffener 10 for the side cover is kept within the width of the side cover, thus facilitating production and saving materials. The cylinder cover and the hole on the cylinder 5 can also be disassembled for shrink fit. The material of the cylinder cover is low density PE, which can be easily installed and disassembled, and keep good sealing; the cylinder cover can be reused to save cost. In addition, the role of stiffener 10 is to avoid glue overload, because plastic parts can't be too thick locally, it will easily cause shrinkage and lead to bad products.

As a further improvement for the above embodiment, the driven shaft 2 is configured to be constituted by a plurality of rectangular plates 22. The rectangular plate is more easily to fix the structure such as the ring frame, which is flexible and practical, increases the strength of the driven shaft, and enables the driven shaft to have a certain ability to stir the developer.

Figure 12:
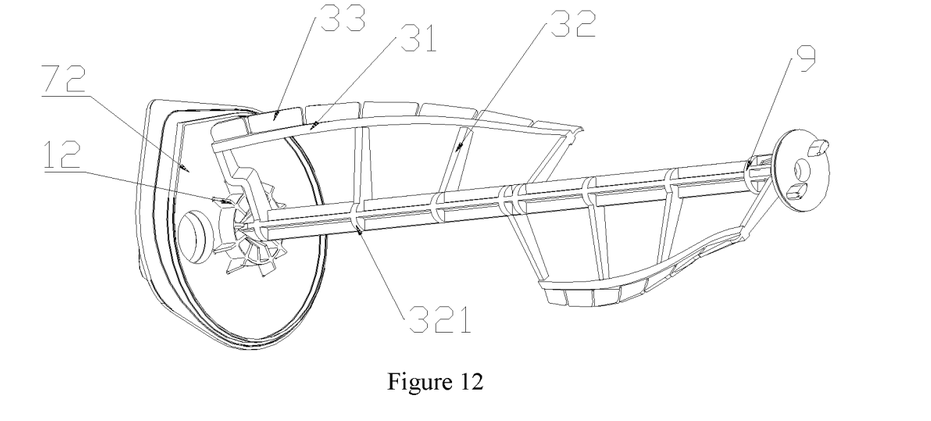
FIG. 12 is a connection structure schematic illustration of the driven shaft, the agitating screw and end cover of the developer storage container in accordance with an embodiment of the present invention.
Figure 13:
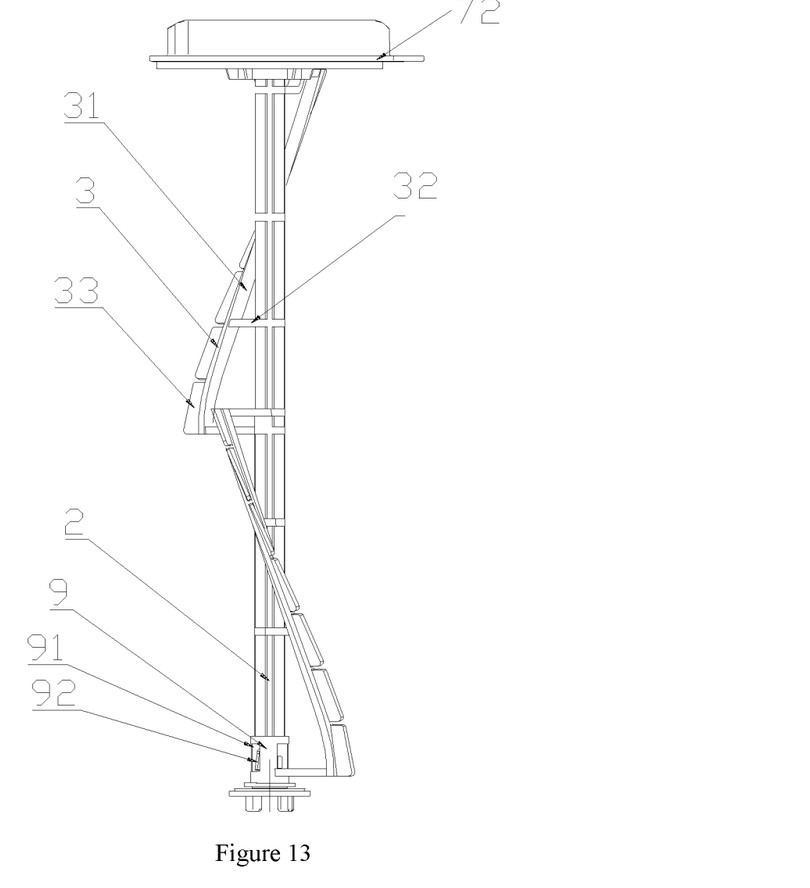
FIG. 13 is an angle schematic illustration of the inner structure of the developer storage container in accordance with an embodiment of the present invention.
Figure 14:
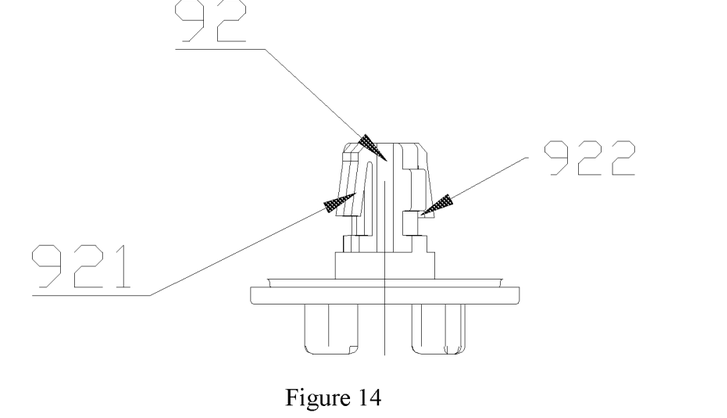
FIG. 14 is a chuck schematic illustration of the developer storage container in accordance with an embodiment of the present invention.
Figure 15:
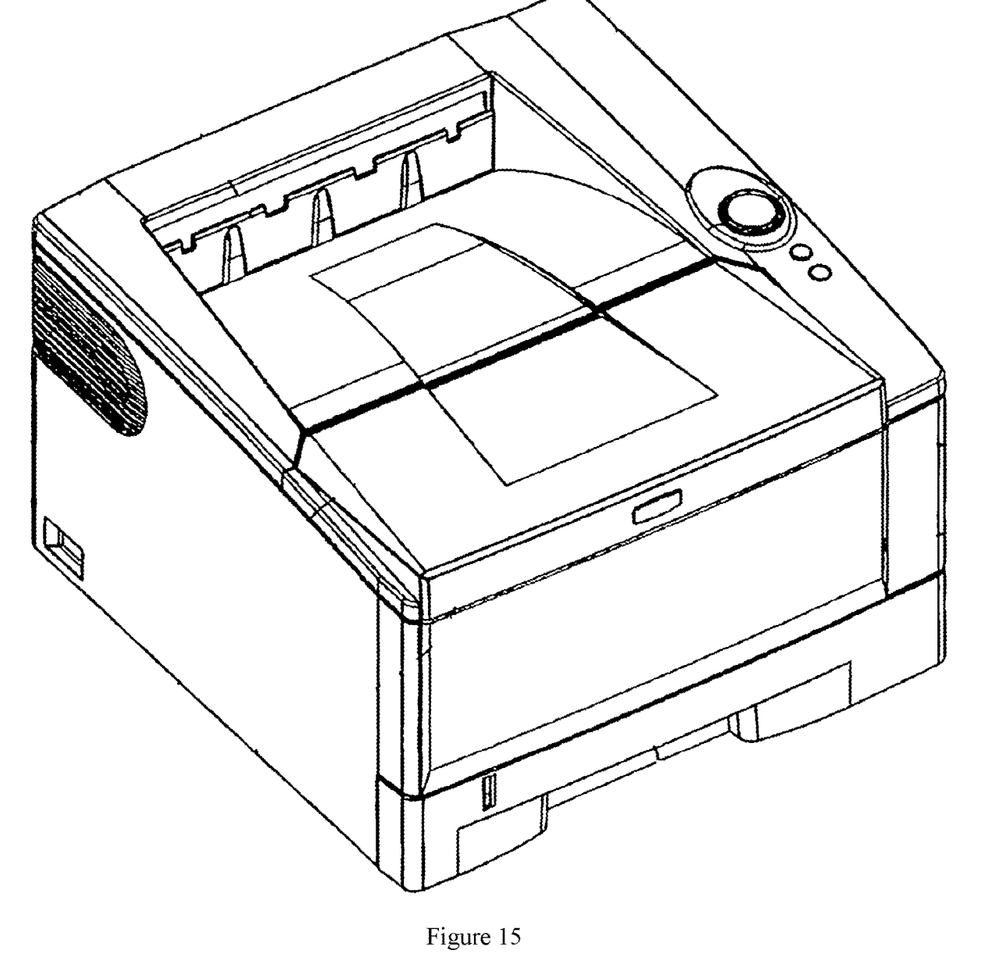
FIG. 15 is a structure schematic illustration of the imagine forming device in accordance with an embodiment of the present invention.

As a further improvement for the above embodiment, as shown in FIG. 12, a plurality of connecting ring frames 321 are fixed on the connecting pillar 32; the connecting ring frame 321 is connected to one end of the connecting pillar 32. It is easy and convenient for the connection ring frame to combine with other components; the connecting ring frame 321 is integrally or detachably connected to the connecting pillar 32. When integrally formed, it can be directly processed by the mold, which is convenient for mass production; when it is detachably connected, it can be easily disassembled.

Figure 6:
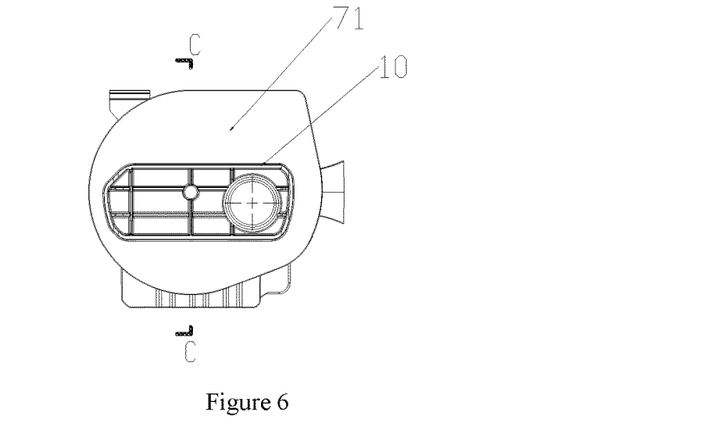
FIG. 6 is a structure schematic illustration of the left view of the developer storage container in accordance with an embodiment of the present invention.
Figure 7:
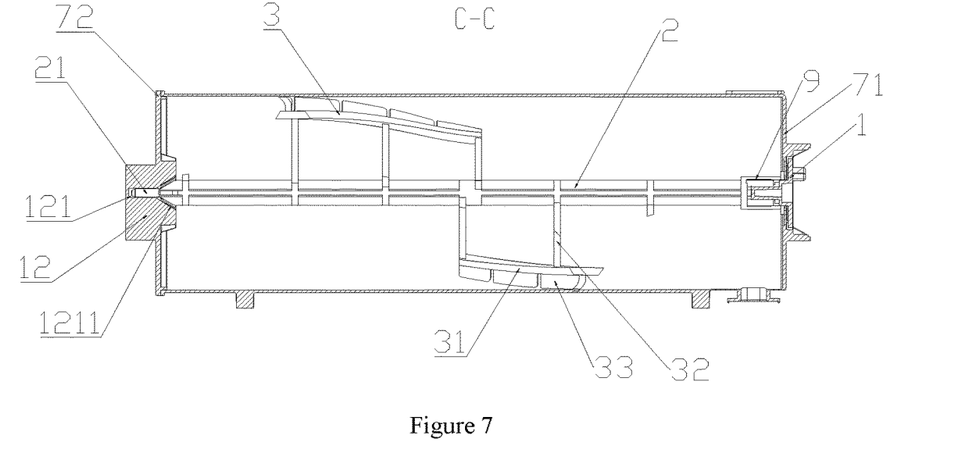
FIG. 7 is C-C section schematic illustration in FIG. 6 of the developer storage container in accordance with an embodiment of the present invention.
Figure 8:
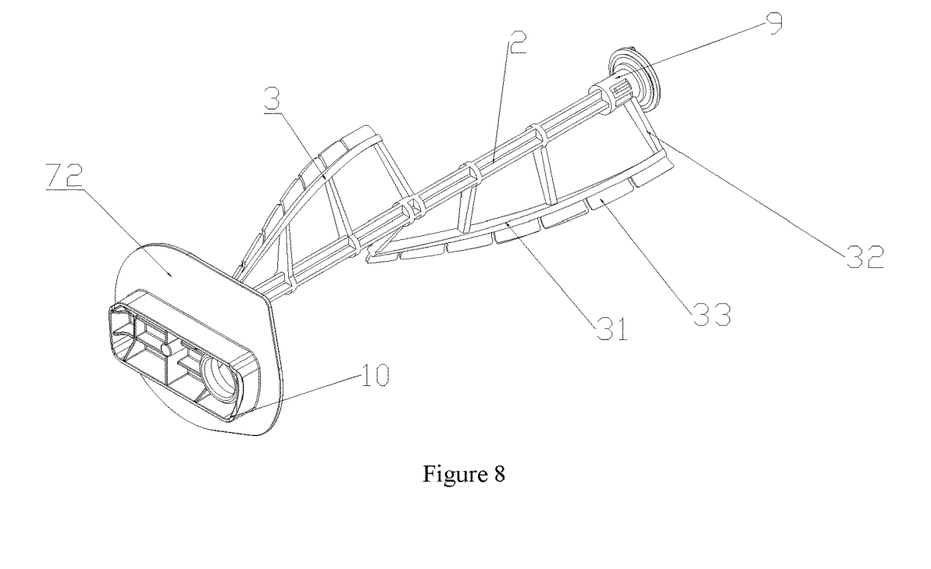
FIG. 8 is a structure schematic illustration of the side cover and the inner of the developer storage container in accordance with an embodiment of the present invention.
Figure 9:
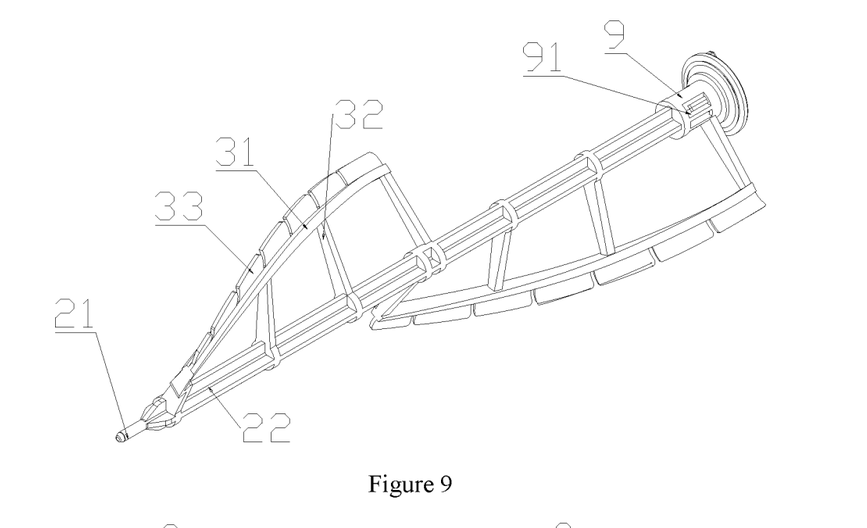
FIG. 9 is a structure and connection schematic illustration of the driven shaft and the agitating screw of the developer storage container in accordance with an embodiment of the present invention.
Figure 10:
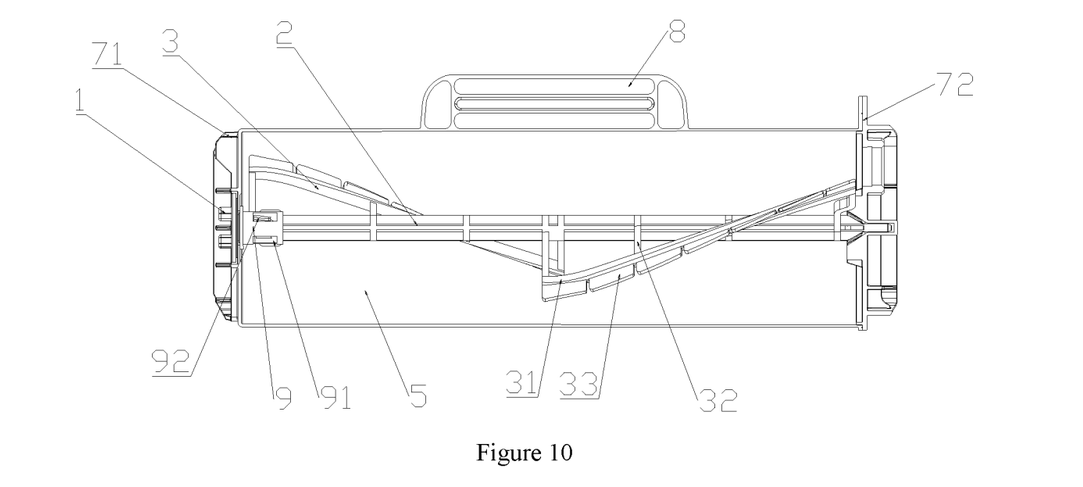
FIG. 10 is a structure schematic illustration after sectioning and removing the developer storage container in accordance with an embodiment of the present invention.
Figure 11:
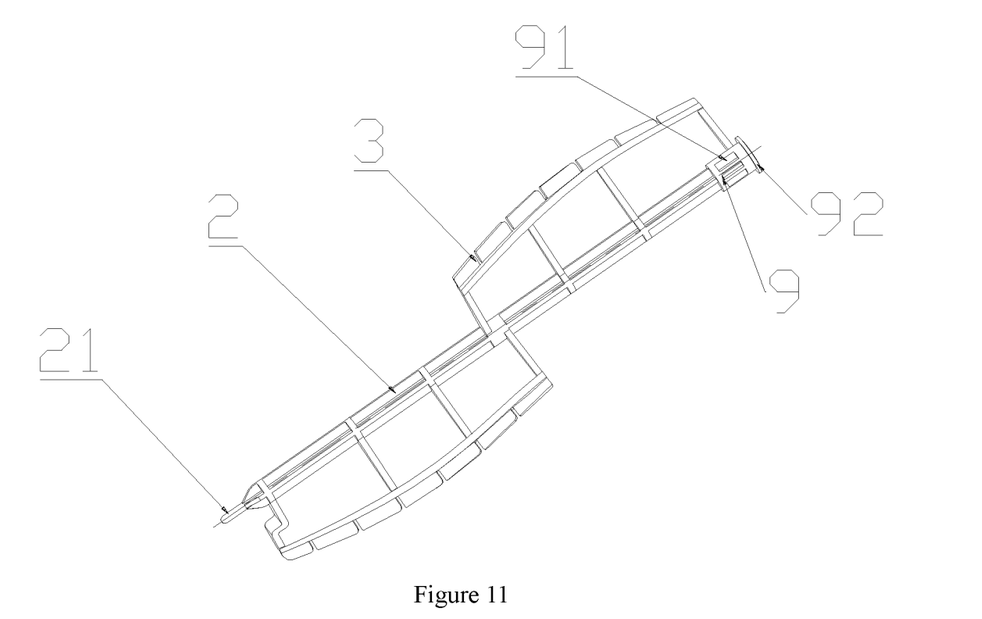
FIG. 11 is an inner structure schematic illustration of the developer storage container in accordance with an embodiment of the present invention.

As a further improvement for the above embodiment, as shown in FIG. 6, the side wall of the cylinder 5 is provided with a rectangular wavy bulge 6 for placing the cylinder 5. The bulge is capable of placing the cylinder body, and the cylinder body can be stably placed on the plane; the rectangular wavy bulge 6 are more stable, beautiful and practical.

Figure 1:
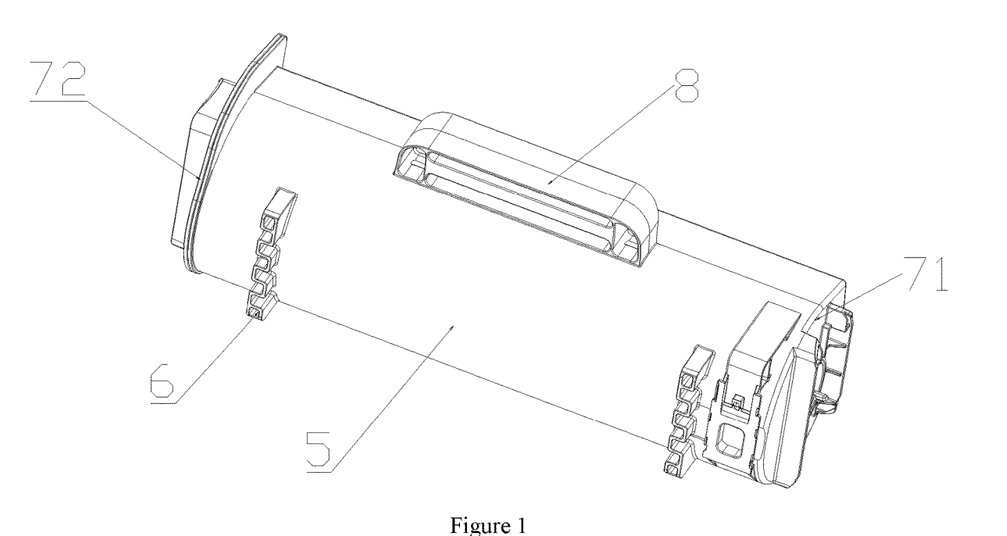
FIG. 1 is a schematic illustration of three-dimensional view of the developer storage container in accordance with an embodiment of the present invention.
Figure 2:
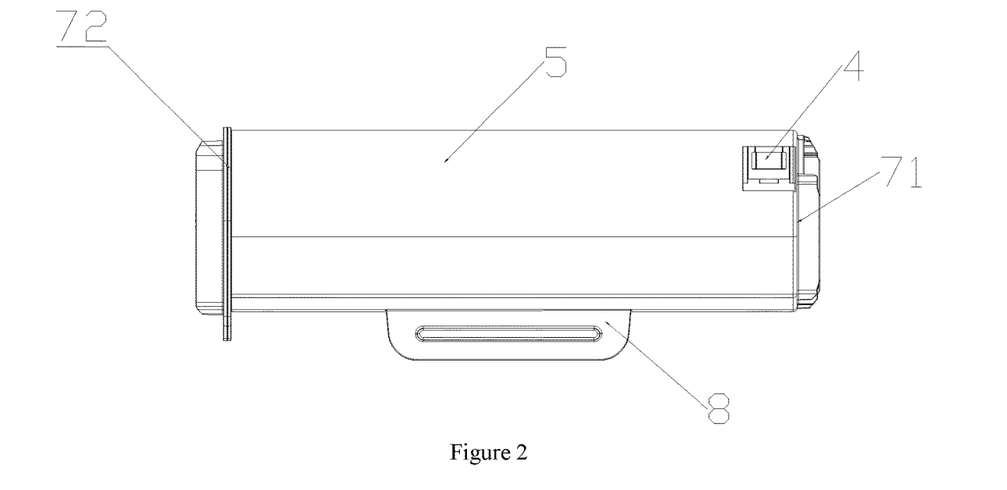
FIG. 2 is a structure schematic illustration of one directional-view of the developer storage container in accordance with an embodiment of the present invention.
Figure 3:
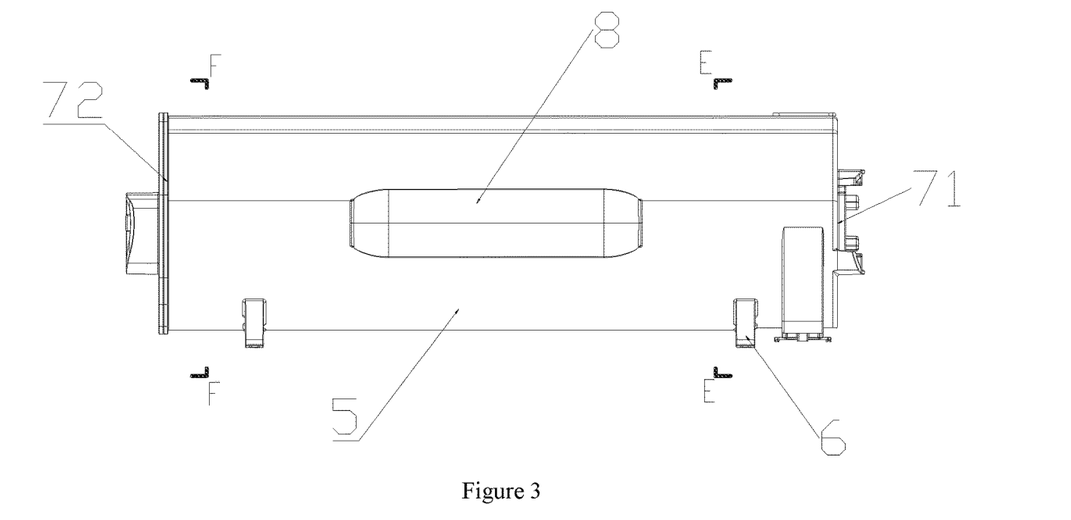
FIG. 3 is a structure schematic illustration (another directional-view) of the developer storage container in accordance with an embodiment of the present invention.
Figure 4:
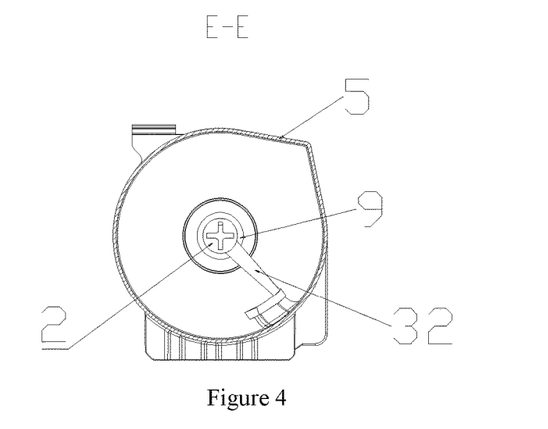
FIG. 4 is E-E section schematic illustration in FIG. 3 of the developer storage container in accordance with an embodiment of the present invention.
Figure 5:
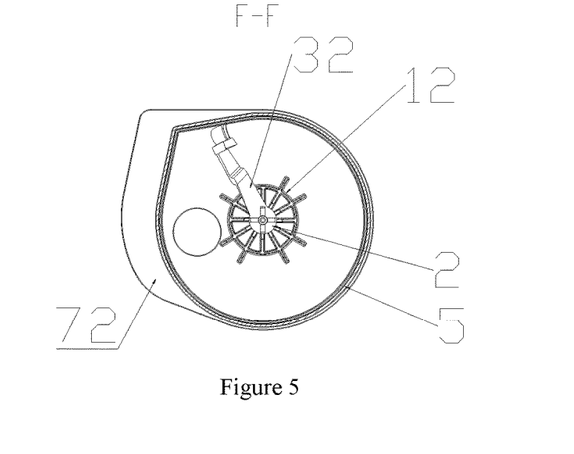
FIG. 5 is F-F section schematic illustration in FIG. 3 of the developer storage container in accordance with an embodiment of the present invention.

In order to facilitate the extraction of the powder container and the production process, as shown in FIGS. 1, 2, 3, the outside of the side of the cylinder 5 is provided with a flat handle 8; the handle 8 is detachably or fixedly connected to the cylinder 5. The flat handle makes it easy to take and place the developer container, and the detachable connection handle 8 is convenient for boxing and transportation, and is convenient to disassemble.

As a further improvement for the above embodiment, the connecting pillar 32 and the spiral base plate 31 or/and the driven shaft 2 are integrally formed, or one or more connecting pillars 32 and the spiral base plate 31 or/and the driven shaft 2 are detachably connected. When forming integrated, the mass production is convenient; the processing and installation is easy, and the structure is stable and firm. One or more connecting pillars 32 are detachably connected to the spiral base plate 31 and the driven shaft 2, which can increase flexibility; the number of connecting pillars 32 is arranged according to the actual application situation, and the product maintenance is convenient.

The present invention provides an image forming device, including a developer storage container and the development unit stated above, and the developer storage container provides a developer for the development unit. The developer storage container is easy to use and does not need to install additional developer conveying elements. Therefore, the problems are to prevent from the root causes such as the dropping of developer conveying elements, inadequate scraping power and insufficient delivery of developer and so on. The developer storage container has a developer supply port 4, and the developer storage container can convey the developer to the supply port, and provide a supplementary developer for printers, photocopiers, etc. It is not necessary to install additional developer conveying elements. Therefore, the problems are to prevent from the root causes such as the dropping of developer conveying elements, inadequate scraping power and insufficient delivery of developer and so on. The embodiment of the present invention describes one of the image forming device, and it includes: the above developer storage container; the imagine carrier, and it can form electrostatic latent shadow on its surface, and also carries the developer image; the development unit, the developer is supplied from the developer storage container; the developer is provided to the image carrier from the development unit, then the electrostatic latent image formed on the image carrier is shown as a developer image; the transfer printing section, it transfers the developer image from the image carrier to the sheet; the developer storage container has developer discharge port, which provides the supplementary developer to the supply port of the development unit. It is not necessary to install additional developer conveying elements. Therefore, the problems are to prevent from the root causes such as the dropping of developer conveying elements, inadequate scraping power and insufficient delivery of developer and so on. The development unit includes the following parts: the shell, it has a developer conveying channel, which can convey the developer in a given conveying direction; the developer supplement port, it locates under the developer discharge port, the opening of the shell, and receiving the developer from the developer storage container to the developer conveying channel; the agitating screw 3 is provided with a spiral base plate 31 that can rotate with the driven shaft 2; the spiral base plate 31 is disposed on the side of the driven shaft 2; the first end of the spiral base plate 31 is close to the driven shaft 2; the first end to the second end of the spiral base plate 31 gradually moves away from the driven shaft 2; the first end to the second end of the spiral base plate 31 extend in a spiral shape; the spiral base plate 31 is fixedly connected to the driven shaft 2; a plurality of blades 33 are arranged on the spiral base plate 31, which one end is connected to the spiral substrate 31 and the other end is free. The developer is smoothly conveyed when stirring developer; in addition, the spiral shape of the spiral base plate 31 makes the rotating torsion of the rotating screw smaller, and it is easy to operate and the efficiency is improved; the stirring function of the agitating screw 3 is further enhanced.

For the developer storage container in the present invention, as shown in FIG. 2, the agitating screw 3 will transport developer evenly and steadily to developer supply port 4 while stirring developer; the agitating screw 3 will scrape the developer of developer supply port 4 out of the developer storage container while stirring. Because the agitating screw 3 is set to be spiral shape, the rotation of the agitating screw 3 allows the developer to be smoothly conveyed while stirring the developer; in addition, the spiral shape makes the rotating torsion of the rotating screw smaller, and it easy to operate and the efficiency is improved. The driving gear 1 drives the driven shaft 2 to rotate; while the driven shaft 2 rotates, the agitating screw 3 rotates; The driving relationship is simple, and the stirring is sufficient; the developer can be conveyed while stirring, thereby improving the working efficiency and reducing the cost.

The present invention is illustrated by the preferred embodiments. The persons skilled in the art know that the various modifications or equivalent substitutions may be made to these features and embodiments without departing from the spirit and scope of the present invention. The present invention is not limited by the embodiments disclosed herein, and other embodiments within the claims of the present application all belong to the protection scope of the invention.

What is claimed is:

1. A developer storage container comprising a cylinder, a developer, a driven shaft, a driving gear, and an agitating screw, wherein,
   the cylinder extends along a length direction of the cylinder; an inner space of the cylinder is configured to accommodate the developer, and a developer supply port that communicates with the inner space is disposed on a side of the cylinder;
   the driven shaft is arranged in the inner space of the cylinder and extends along the length direction of the cylinder;
   the driving gear is located on a side cover of the cylinder and connected with a first end of the driven shaft;
   a rotation of the agitating screw generates a thrust, so that the developer is enabled to be transported along an axis of the cylinder; and
   the driving gear drives the driven shaft to rotate, and then drives the agitating screw to rotate;
   wherein, the driving gear is located on a first side cover of a first side of the cylinder; the driving gear is clamped to the first end of the driven shaft.

2. The developer storage container according to claim 1, wherein,
   the agitating screw comprises a spiral base plate capable of rotating with the driven shaft and a plurality of blades, one end of each of the plurality of blades is fixed on the spiral base plate.

3. The developer storage container according to claim 2, wherein,
   the spiral base plate is arranged on an outer side of the driven shaft; a first end of the spiral base plate is close to the driven shaft; from the first end to a second end of the spiral base plate, the spiral base plate extends around the driven shaft in a spiral shape and gradually moves away from the driven shaft; and the first end and the second end of the spiral base plate are fixedly connected with the driven shaft.

4. The developer storage container according to claim 2, wherein,
   at least two agitating screws are configured; and
   all of the agitating screws are fixed and distributed on the driven shaft in turn, and orientations of the at least two agitating screws are identical.

5. The developer storage container according to claim 2, wherein,
   a clearance is arranged between the adjacent blades;
   a side of the blade and an outer surface of the spiral base plate present a first preset angle, and the plurality of blades are spirally arranged with a spiral extension of the spiral base plate.

6. The developer storage container according to claim 2, wherein,
   the agitating screw further comprises at least one connecting pillar;
   a first end of the connecting pillar is connected with the driven shaft, and a second end of the connecting pillar is connected with the spiral base plate.

7. The developer storage container according to claim 6, wherein,
   a second preset angle is deflected between two adjacent connecting pillars, so that the spiral base plate spirally extends along the driven shaft.

8. The developer storage container according to claim 1, wherein,
   the first end of the driven shaft is provided with a sleeve; an inner side wall of the driving gear is provided with a chuck matched with the sleeve and a sleeve socket; the chuck is inserted into the sleeve such that the driving gear is clamped with the first end of the driven shaft.

9. The developer storage container according to claim 8, wherein,
   a plurality of elastic clamps are arranged on the chuck; the sleeve is provided with a plurality of clamp holes corresponding to the plurality of elastic clamps; a plurality of ends of the plurality of elastic clamps are each provided with a clamp stand;
   when the chuck is inserted into the sleeve, each elastic clamp is inserted into a corresponding clamp hole until the clamp stand is clamped into the clamp hole and a clamping connection is formed.

10. A developer storage container comprising a cylinder, a developer, a driven shaft, a driving gear, and an agitating screw, wherein,
    the cylinder extends along a length direction of the cylinder; an inner space of the cylinder is configured to accommodate the developer, and a developer supply port that communicates with the inner space is disposed on a side of the cylinder;
    the driven shaft is arranged in the inner space of the cylinder and extends along the length direction of the cylinder;
    the driving gear is located on a side cover of the cylinder and connected with a first end of the driven shaft;
    a rotation of the agitating screw generates a thrust, so that the developer is enabled to be transported along an axis of the cylinder; and
    the driving gear drives the driven shaft to rotate, and then drives the agitating screw to rotate;
    wherein,
    a bearing box is arranged on a second side cover of a second side of the cylinder;

a second end of the driven shaft is provided with a rotary needle;
a middle part of the bearing box is provided with a bearing hole matched with the rotary needle;
the rotary needle is inserted into the bearing box; and
the rotary needle is rotatably connected with the bearing box.

11. The developer storage container according to claim 10, wherein,
a positioning hole with a tapered cross section is arranged in the middle of the bearing box in the inner space of the cylinder; and
the positioning hole is surrounded by a plurality of ribs.

12. The developer storage container according to claim 1, wherein,
a second side cover on a second side of the cylinder is welded with the cylinder by ultrasonic wave;
the second side cover is fixed with a stiffener; and
a length of the stiffener does not exceed a width of the second side cover.

13. The developer storage container according to claim 1, wherein,
the driven shaft is composed of a plurality of rectangular plates.

14. The developer storage container according to claim 6, wherein,
a connection ring frame is fixed on the connecting pillar;
the connecting ring frame is connected with one end of the connecting pillar; and
the connecting ring frame and the connecting pillar are integrally formed or detachably connected.

15. The developer storage container according to claim 1, wherein,
a side wall of the cylinder is provided with a rectangular wavy bulge for placing the cylinder.

16. The developer storage container according to claim 1, wherein,
a flat handle is arranged outside the side of the cylinder; and
the flat handle and the cylinder are detachably connected or fixedly connected.

17. The developer storage container according to claim 6, wherein,
the connecting pillar, the spiral base plate or/and the driven shaft are integrally formed, or one or more connecting pillars, the spiral base plate or/and the driven shaft are detachably connected.

18. An image forming device comprising the developer storage container and the development unit described in claim 1, the developer of the developer storage container is configured for a development unit.

19. The image forming device according to claim 18, wherein the agitating screw comprises a spiral base plate capable of rotating with the driven shaft and a plurality of blades, one end of each of the plurality of blades is fixed on the spiral base plate.

* * * * *